Figure 1:
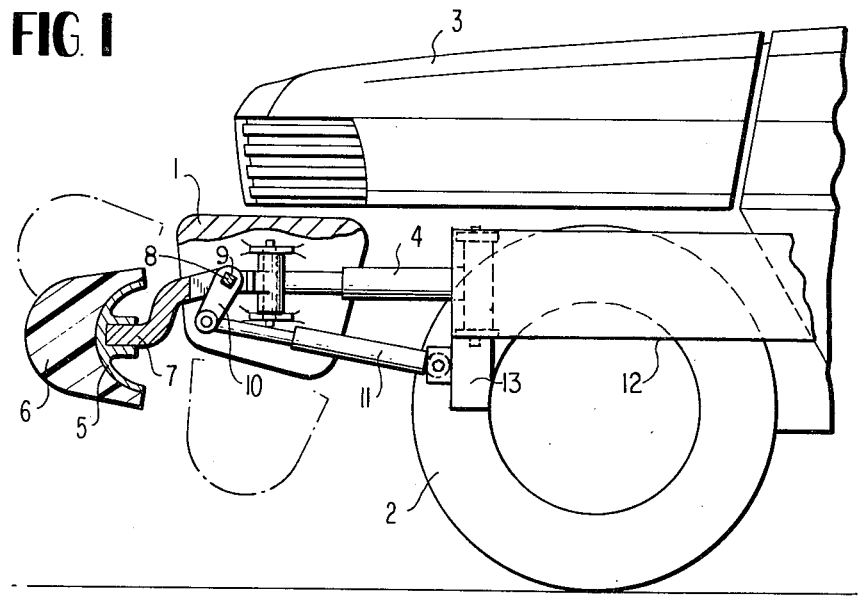

United States Patent [19]
Barényi et al.

[11] 3,992,047
[45] Nov. 16, 1976

[54] MOTOR ACTUATED SHIFTABLE SUPPLEMENTAL BUMPER

[75] Inventors: Béla Barényi, Sindelfingen; Hermann Renner, Magstadt, both of Germany

[73] Assignee: Daimler-Benz Aktiengesellschaft, Germany

[22] Filed: Oct. 16, 1974

[21] Appl. No.: 515,259

[30] Foreign Application Priority Data
Oct. 17, 1973  Germany............................ 2352179

[52] U.S. Cl....................................... 293/9; 293/24; 293/48; 293/66; 293/71 R; 293/73; 293/97; 293/100

[51] Int. Cl.².................. B60R 19/06; B60R 19/08; B60R 21/14; B61F 19/04

[58] Field of Search............... 293/9, 10, 24, 42, 53, 293/58, 60, 70, 71 R, 71 P, 73, 85, 86, 21, 25, 26, 31, 34, 38, 43, 44, 47, 48, 66, 97, 100

[56] References Cited
UNITED STATES PATENTS

| | | | |
|---|---|---|---|
| 761,421 | 5/1904 | Snyder | 293/42 |
| 1,515,565 | 11/1924 | Finnegan | 293/71 P X |
| 1,642,233 | 9/1927 | Elliott | 293/26 |
| 1,704,768 | 3/1929 | Sigman | 293/71 R |
| 1,795,727 | 3/1931 | Marston | 293/71 P X |
| 3,847,427 | 11/1974 | Eshelman | 293/71 P X |
| 3,851,911 | 12/1974 | Brooks | 293/86 X |

*Primary Examiner*—Robert J. Spar
*Assistant Examiner*—Howard Beltran
*Attorney, Agent, or Firm*—Craig & Antonelli

[57] ABSTRACT

A protective installation for a motor vehicle which includes a bumper mounted transversely in front of the respective vehicle end while a further outwardly projecting cross beam which is preferably padded is arranged underneath the bumper.

13 Claims, 2 Drawing Figures

MOTOR ACTUATED SHIFTABLE SUPPLEMENTAL BUMPER

The present invention relates to an impact protection for a motor vehicle which includes a bumper to be mounted at the vehicle frame structure or the like transversely in front of the vehicle front end or vehicle rear end.

Such bumper protections have essentially the task to protect a vehicle against damages during relatively harmless accidents or impacts and especially when maneuvering to park the vehicle.

The present invention is concerned with the task to so further develop a protective installation of the aforementioned type that the accident consequences or accident dangers for a pedestrian hit by a vehicle are avoided or reduced. The present invention essentially consists in that a further outwardly projecting cross beam preferably equipped or shielded with synthetic resinous material is mounted underneath the bumper. This low cross beam assures that in case of an accident a pedestrian is seized by this cross beam so low that he is not toppled over and subsequently driven over. Instead, the pedestrian is so tipped over by this low cross beam that he impinges against the vehicle front end whereby a tilting movement is obtained which is favorable from an accident-mechanical point of view. Additionally, a locally smaller surface pressure is obtained so that the injury danger is smaller.

In order not to impair the vehicle during the driving operation, for example, on uneven terrain or the like, it is advantageous if the cross beam is arranged adjustable in height. In a particularly advantageous embodiment, provision is made that the cross beam is pivotally arranged at a cross shaft by means of lever arms. Not only the advantage results therefrom that a larger angle of slope can be achieved by instead that also the vehicle can be shortened by pivoting-in the cross beam, for example when parking. It is thereby favorable if a preferably hydraulic pivot drive is provided for the cross beam.

For purposes of reducing the injury danger, it is favorable if the cross beam is retained yieldingly or elastically. Additionally, it is assured thereby that the cross beam is not damaged when driving against a fixed obstacle but that instead the bumper then comes into use.

For manufacturing and assembly reasons, it is advantageous if the cross beam is secured within the area of the bumper mountings. In this manner, no additional fastening places have to be provided at the vehicle support structure.

Accordingly, it is an object of the present invention to provide a protective installation for motor vehicles which avoids by simple means the aforementioned shortcomings and drawbacks encountered in the prior art.

Another object of the present invention resides in a protective installation for a motor vehicle which far-reachingly reduces the danger to pedestrians who might be accidentally hit by the vehicle.

A still further object of the present invention resides in a protective installation for a motor vehicle which assures that a pedestrian who is accidentally struck is not toppled over and subsequently driven over during an accident.

Still another object of the present invention resides in a protective installation which not only considerably reduces the injury danger to pedestrians accidentally hit by a vehicle but also assures to the thus-struck pedestrian a smaller specific surface pressure during his impact against the vehicle body.

A still further object of the present invention resides in a protective installation of the type described above which is simple in construction and avoids the need for additional complicated fastening means.

Figure 2:
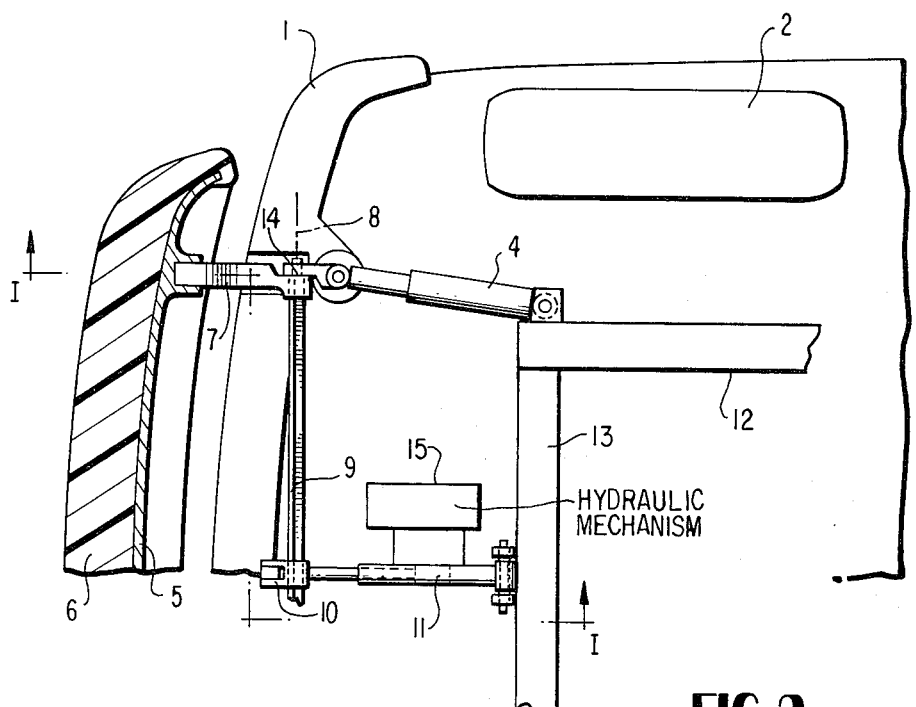

These and further objects, features and advantages of the present invention will become more apparent from the following description when taken in connection with the accompanying drawing which shows, for purposes of illustration only, one embodiment in accordance with the present invention, and wherein:

FIG. 1 is a schematic longitudinal cross-sectional view through an end portion of a motor vehicle taken along line I—I of FIG. 2; and FIG. 2 is a schematic partial cross-sectional view in the substantially horizontal direction through the motor vehicle end portion of FIG. 1.

Referring now to the drawing wherein like reference numerals are used throughout the two views to designate like parts and more particularly to FIG. 1, the forward area of a passenger motor vehicle is illustrated in this figure in which a bumper 1 of conventional construction is accommodated which is disposed approximately at the height of the upper edges of the front wheels 2 and projects slightly beyond the forward end of the vehicle formed by the engine hood 3. The bumper 1 which is made of a deformation-rigid metal member, is secured at the frame structure 12,13 of the motor vehicle with the aid of shock-absorbers 4 whereby the pivotal connection of the shock absorbers 4 at the frame structure and at the bumper 1 takes place by way of joints with vertical axes. The term "frame structure" is used herein to describe those relatively fixed parts of the vehicle, at which the bumper is normally secured in the manner described above and which are constituted either by separate frame members or by equivalent frame-like members of a self-supporting body structure.

In order to lessen or avoid the injury danger for pedestrians struck by the vehicle, a cross beam 5 is arranged in front of the bumper 1 and underneath the same, which has an outwardly curved, half-shell-shaped cross section and which is covered off against the outside with a thick padding 6 of foamed material or the like of conventional type. This cross beam 5 is arranged approximately 30 cm. above the road surface. It is achieved by this cross beam 5 that a pedestrian is seized very low so that, when being hit by the car, he is tilted over toward the forward portion of the vehicle which is relatively favorable from an accident-mechanical point of view and additionally lessens the danger of being driven over. The pedestrian who is tossed over by the cross beam 5 impinges with a tilting movement onto the relatively deformation-soft engine hood 3 which forms an impact surface with a large area and distributes the existing impact force uniformly so that the danger of serious injuries is reduced. It is thereby favorable that the bumper 1 and the cross beam 5 project clearly beyond the forward vehicle end.

The cross beam 5 is pivotally suspended above a cross axis 8 by way of two cranked lever arms 7 so that it can be pivoted into the position indicated in FIG. 1 in dash lines. It is also possible to lift the cross beam 5 in order to increase the ground clearance of the vehicle or to increase the necessary slope angle. Additionally, it is possible to pivot the cross beam 5 underneath the bumper 1 in order to shorten the vehicle, for example, when parking. It is thereby assured by a hydraulic actuating mechanism that the cross beam 5 automatically assumes the illustrated position, out of which it can be pivoted only by actuation of an actuating lever or knob or the like. For that purpose, the two lever arms 7 are connected with each other by a rod 9, with which a lever 10 is non-rotatably connected in the center thereof so as to rotate in unison therewith; a hydraulic piston-cylinder assembly 11, having a hydraulic drive mechanism 15, and forming the actuating means engages at the lever 10. This rod 9 has a square profile so that a safe connection with respect to the lever 10 is assured. The rod 9 which is pivotally connected by a pivot 14 at its two ends to define the pivot axis 8 is approximately constructed as torsion rod spring. It is achieved in this manner that in case of larger forces, the lever arms 7 together with the cross beam 5 can be pivoted rearwardly underneath the bumper 1.

The cross beam 5 is secured at the bumper 1 by means of its lever arms 7, which appropriately takes place within the area of the mounting means of the bumper 1. It is possible thereby to construct the bumper 1 and the cross beam 5 as a structural unit forming a subassembly which can be then mounted as such in the vehicle.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:
1. A protective installation for vehicles comprising a bumper member mounted at a relatively fixed part of a vehicle to extend outwardly from the vehicle end; cross-beam means mounted to extend outwardly of said bumper member; pivot means for pivoting said cross-beam means at said bumper member, said pivot means including torsion spring means and first lever means connected to said cross-beam means and said torsion spring means for pivotally positioning said cross-beam means; and adjusting means connected to said torsion spring means for rotating said torsion spring means such that said cross-beam means is adjustable in position.

2. A protective installation according to claim 1, wherein said adjusting means includes actuating means for providing rotational forces on said torsion spring means and second lever means connected to said torsion spring means and said actuating means for transmitting said rotational forces to said torsion spring means.

3. A protective installation according to claim 2, wherein said torsion spring means includes an elongated rod having a square profile, and wherein each of said first and second lever means have a square aperture for securely engaging said rod profile.

4. A protective installation according to claim 2, wherein said actuating means includes a hydraulic drive mechanism including a piston-cylinder assembly.

5. A protective installation according to claim 4, wherein said torsion spring means includes an elongated rod having a square profile, and wherein each of said first and second lever means have a square aperture for securely engaging said rod profile.

6. A protective installation according to claim 5, wherein said cross-beam means is mounted elastically.

7. A protective installation according to claim 6, wherein said cross-beam means includes a member having an approximately half-shell-shaped convex cross-section.

8. A protective installation according to claim 7, wherein said member is outwardly padded.

9. A protective installation according to claim 1, wherein said cross-beam means is mounted elastically.

10. A protective installation according to claim 1, wherein said cross-beam means includes a member having an approximately half-shell-shaped convex cross-section.

11. A protective installation according to claim 10, wherein said member is outwardly padded.

12. A protective installation according to claim 1, wherein said relatively fixed part of said vehicle includes a frame structure.

13. A protective installation according to claim 1 wherein said cross-beam means is adjusted according to vertical position relative to the plane of the bumper.

* * * * *